(No Model.) 2 Sheets—Sheet 1.

J. A. AYRES.
Water Meter.

No. 241,775. Patented May 24, 1881.

Attest:
H. D. Perine
Danl. Kelly.

Inventor.
Jared A. Ayres
By. Pomerison & Tomlinson
Attorneys

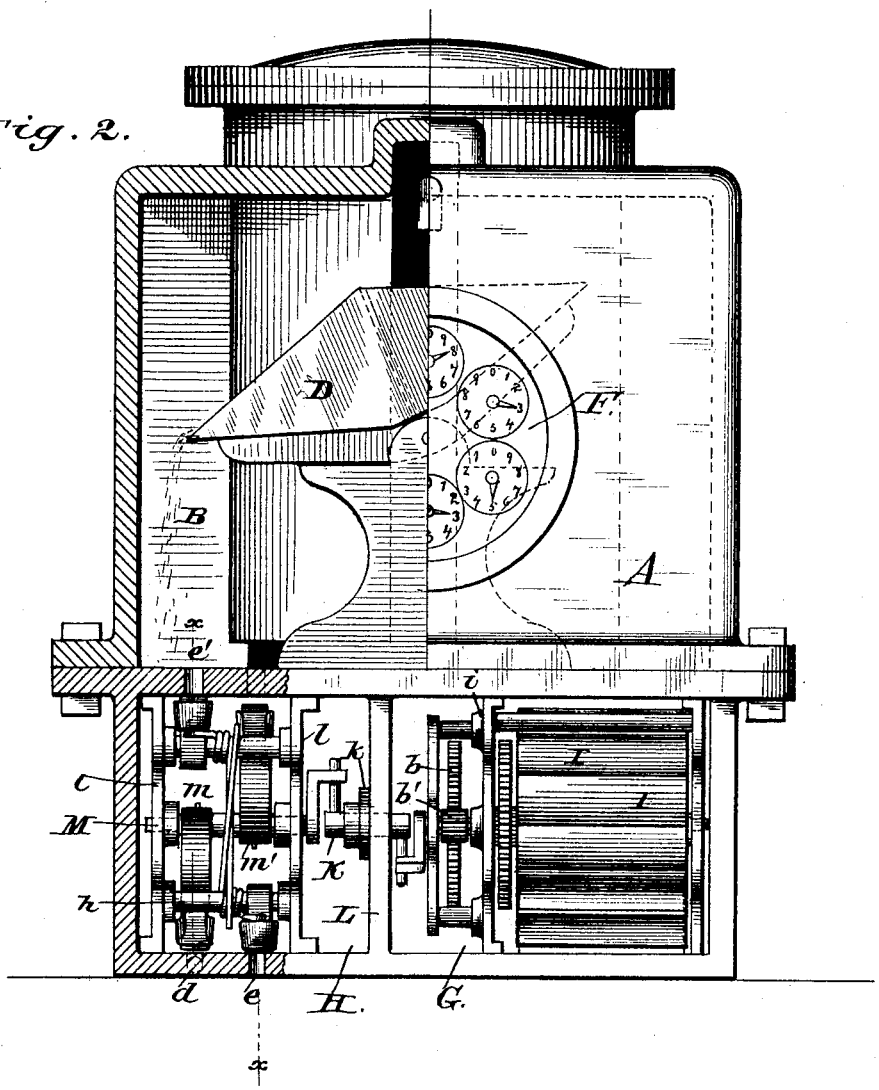

UNITED STATES PATENT OFFICE.

JARED A. AYRES, OF MYSTIC RIVER, CONNECTICUT.

WATER-METER.

SPECIFICATION forming part of Letters Patent No. 241,775, dated May 24, 1881.

Application filed March 30, 1880. (No model.)

*To all whom it may concern:*

Be it known that I, JARED A. AYRES, of Mystic River, in the county of New London and State of Connecticut, have invented certain new and useful Improvements in Water-Meters, of which the following is a specification.

My invention has for its object to insure at all times a sufficient supply of air in the air-chamber of a water-meter to prevent encroachment of the water upon the measuring-buckets; and it consists in automatic means for forcing air from the exterior of the meter into its air-chamber, and in various combinations of mechanism looking to that end and to compactness and economy of space in the construction of the meter.

Letters Patent were granted to me December 17, 1878, numbered 210,898, for a water-meter wherein the stream is divided into a number of equal or equivalent streams, and one of these streams alone is measured, while the rest are dashed into spray, the purpose of dividing the stream and measuring a fractional part being to lessen the size of the meter by lessening the space and size of the mechanism needful for the measurement, and the purpose of spraying the remaining parts being to release the air held in suspension by the water, and thus replenish the air-supply in the contracted chamber of the meter.

My present invention is intended, mainly, for use with a meter of such construction, and to supplement or supersede the spraying of the water by affording a positive supply of external air to the chamber; but it may be used advantageously with meters of the ordinary construction.

Figure 1:
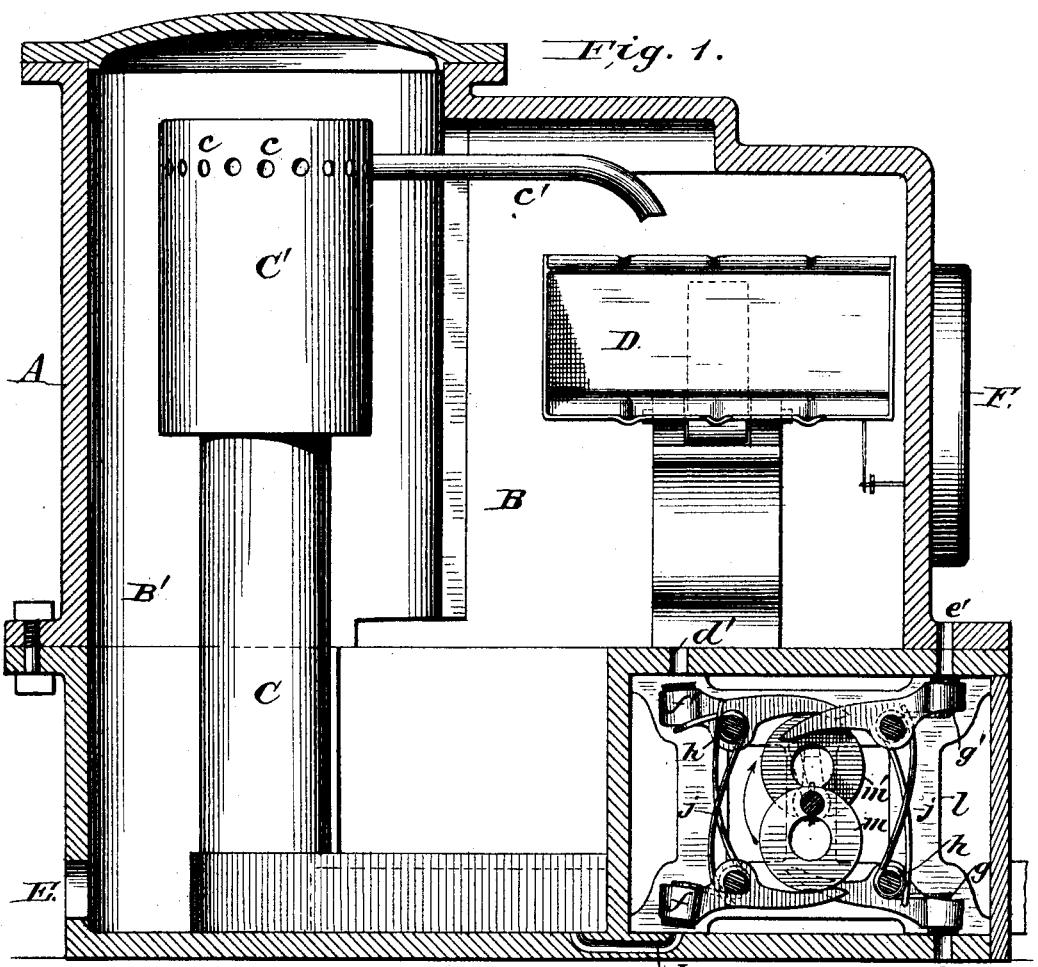
Figure 3:
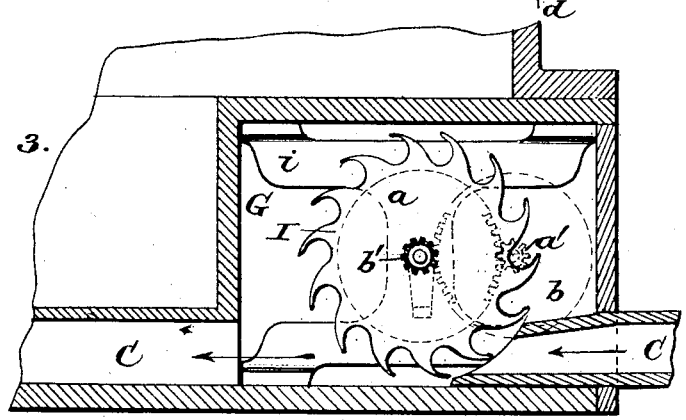

In the drawings, Figure 1 is a vertical section through a meter embodying my invention, showing the air-chamber, the measuring-bucket, and the air-pump. Fig. 2 is a front elevation, partly in section, to show the air-pump and the water-wheel by which it is driven. Fig. 3 is a section through the water-way or pipe and the water-wheel chamber.

A is the casing of the meter, and B the meter-chest, the lower part being the water-basin and the upper part the air-chamber, and the upper rear part of which is so partitioned off and shaped as to form a cylindrical compartment or dome, B'.

C is the induction-pipe rising within the dome to near its top, and terminating in a cap, C', perforated radially and in a horizontal plane with a number of small holes, $c$, uniform in size and equidistant from each other. A pipe or channel, $c'$, leads from one of these holes, and conveys the stream discharged into and through it to the measuring-bucket D in the front compartment of the air-chamber. The streams from the other holes are dashed into spray against the sides of the dome and fall into the water-basin beneath, to be discharged through the eduction-opening E, which connects with the house or delivery pipe. The measuring-bucket is suitably connected with and actuates a registering apparatus, F, upon the face of the meter.

The mechanism thus far described does not differ materially from that described and claimed in the before-mentioned Letters Patent granted to me, and its purpose and mode of operation are fully explained therein.

In the lower front part of the meter, and for convenience in line with each other, are two small chambers, G H. The water from the service-pipe enters the chamber G through the eduction-pipe C, which opens into and leads from the bottom of the chamber, and which is drawn down and flattened, as shown, to give good channel-way beneath an overlying water-wheel, I, journaled in brackets $i$ at the sides of of the chamber. The blades of this wheel are set so as to form buckets opposed to the current. It is not a close-fitting wheel, but simply turns like an undershot wheel in the current as the water flows through the box into the meter-chest. The motion of the wheel is slowed down by means of a set of gears, $a\ a'$ $b\ b'$, and communicated either directly from the last gear or by any suitable means—as by the interposition of a crank and pin, as shown—to the shaft K, which passes through a stuffing-box, $k$, in the partition L into the chamber H.

Four channels or ducts, $d\ d'\ e\ e'$, lead from the chamber H. The channel $d$ opens into the water-basin of the meter-chest at the bottom of the chamber, and the channel $d'$ into the air-space of the meter-chest at the top of the chamber, while the channel $e$ communicates with the external air at the bottom of the chamber, and the channel $e'$ with the external air at the top of the chamber. They are closed respectively by valves $f\ f'\ g\ g'$, mounted on pivots $h$, and pressed down upon their seats by springs $j$.

Journaled in the brackets $l\ l$, which also support the valve-pivots, is a shaft, M. This may be a continuation of the shaft K, or may be actuated by it through the instrumentality of a crank and pin or other means. It carries two cams or eccentrics, $m\ m'$, by which the valves are operated. The cam $m$ acts alternately upon the valve $f$ and the valve $g'$, and the cam $m'$ alternately upon the valve $f'$ and the valve $g$, and they are so arranged that the valves $f$ and $f'$ are opened simultaneously at one interval and the valves $g$ and $g'$ simultaneously in the succeeding interval. As the valves $f$ and $f'$ are thrown open by the action of the cams, water from the meter-chest rushes through the duct $d$ into the chamber H and compresses the air therein so as to expel it through the duct $d'$ into the upper part or air-chamber of the meter. The cams, passing on, leave the valves $f$ and $f'$, which are thereupon closed by their springs, and reach and open the valves $g$ and $g'$, when the water in the chamber drips out through the duct $e$, and air from the exterior of the casing rushes in through the duct $e'$, to be, in turn, forced up into the air-chamber of the meter. By the continued action of the cams and valves air is regularly pumped into the meter, so that, notwithstanding loss by leakage, an abundant supply may be maintained. The amount of this supply will depend upon the frequency with which the pump is operated, and this will be controlled by the gearing. It may therefore be advantageous to use changeable-speed gearing between the water-wheel and cam-shaft, so that the frequency of action may be determinable to suit the varying circumstances and contingencies under which the meter will be employed.

I claim as my invention—

1. In combination with a meter-chest, an air-pump communicating with the external air and discharging into said chest to supply it with air, and a water-wheel contained in a chamber, through which the stream of water is directed on its way to the measuring devices, and geared with said pump to actuate it.

2. The combination of the meter-chest, the chamber G, with its water-wheel, and the chamber H, with its ducts and valves, and cam-shaft geared with such water-wheel.

3. The combination, with the meter-chest, of the chamber H, with ducts $d\ d'$ leading to the water-basin and air-space of the chest, and ducts $e\ e'$ leading to the external air at the bottom and top of said chamber, valves for closing said ducts, and a cam-shaft operating the valves to establish communication alternately with the chest and with the external air.

4. The combination, with a meter-chest containing apparatus for subdividing the stream of water into a number of equal or equivalent streams, measuring one of these streams and dashing the remainder into spray, of an automatic air-pump for replenishing the supply of air within the chest.

JARED A. AYRES.

Witnesses:
 WM. H. POTTER,
 NATHAN S. FISH.